July 20, 1965 C. J. ECKENROD 3,195,907
PACKING WITH FRANGIBLE SUPPORT
Filed Jan. 19, 1962 2 Sheets-Sheet 1
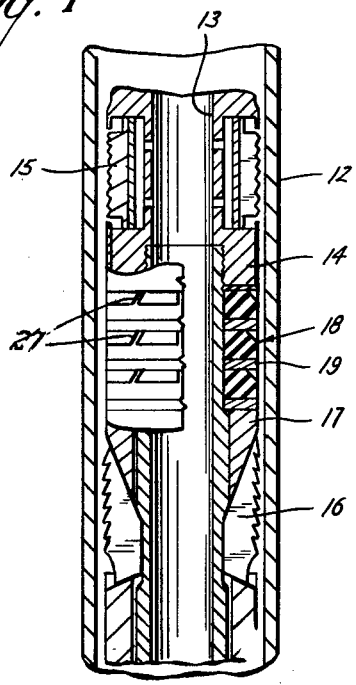
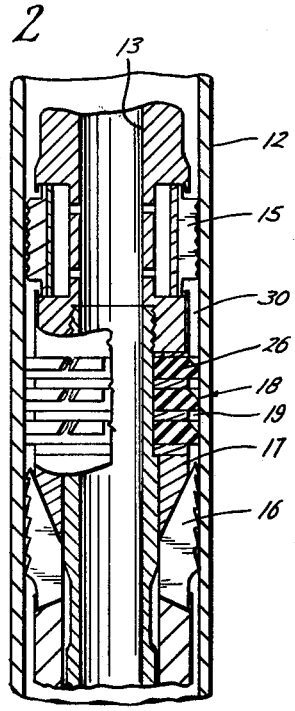
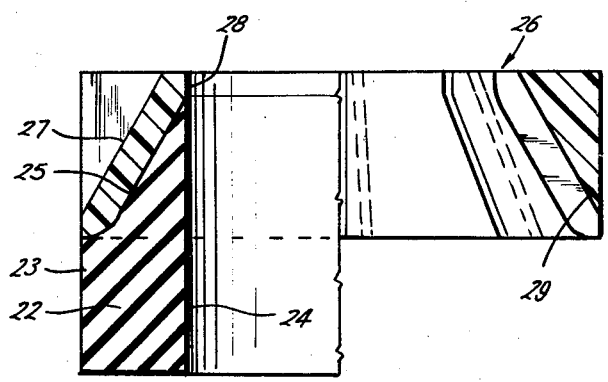
Carl J. Eckenrod
INVENTOR.
BY
ATTORNEY July 20, 1965  C. J. ECKENROD  3,195,907
PACKING WITH FRANGIBLE SUPPORT
Filed Jan. 19, 1962  2 Sheets-Sheet 2
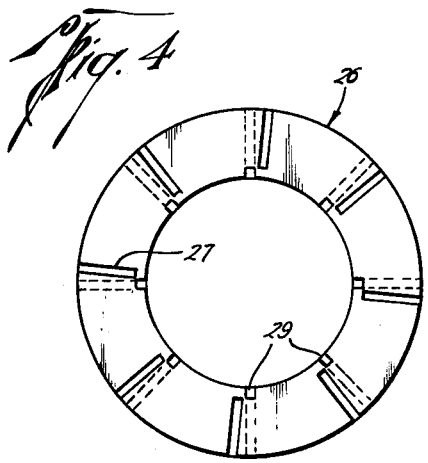
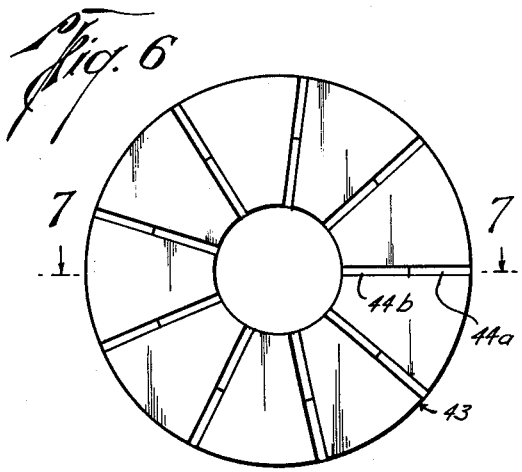
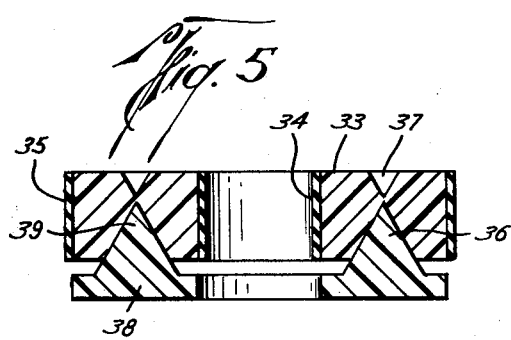
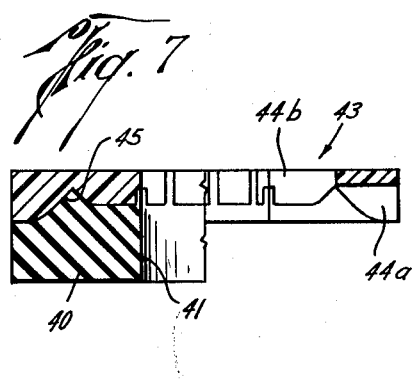
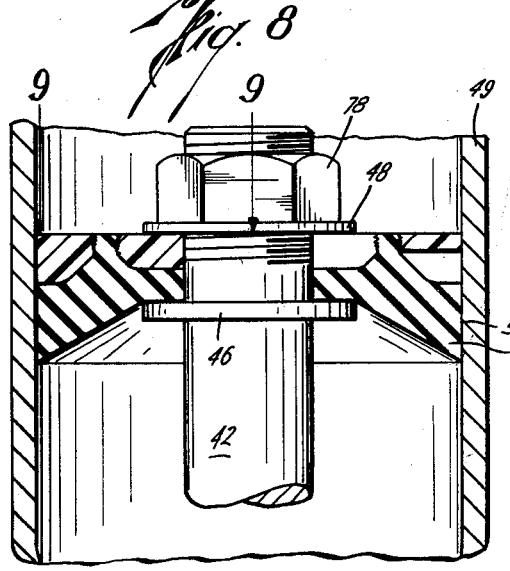
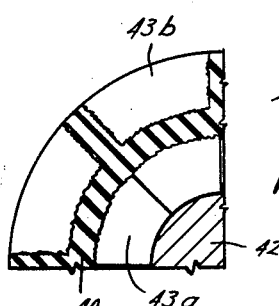
Carl J. Eckenrod
INVENTOR.
BY
Bertram H. Mann
ATTORNEY United States Patent Office 3,195,907
Patented July 20, 1965

3,195,907
PACKING WITH FRANGIBLE SUPPORT
Carl J. Eckenrod, Houston, Tex., assignor to Wyatt Industries, Inc., Houston, Tex., a corporation of Texas
Filed Jan. 19, 1962, Ser. No. 167,352
4 Claims. (Cl. 277—188)

This invention relates to packings of various types for use in sealing spaces exposed to differential fluid pressures and consists, particularly, in novel means for preventing cold flowing or excessive end-wise deformation of the packing material.

Where an annulus is to be provided with a resilient sealing packing, as in the case of a pump piston or a packer or plug of the type, for instance, which is insertable in a well, the end-wise fluid pressure applied to the packing may cause the material to deform axially as, for instance, to project between the cylinder wall and backup washer (or collar). Obviously, this tends to reduce the life of the packer and the efficiency of the seal. It is, in many cases, not practical to provide a back-up washer or collar which closely fits the cylinder or packed shaft or rod. However, it has been suggested that backing and support structure be provided including individual segments which are free to displace radially in conformance with the packing material. Such arrangements are rather difficult and expensive to assemble due to the necessity of holding the segments in their assembled positions while the packing material is applied thereto. This is true whether the back-up structure is molded in or merely clamped to the face of the packing material.

Accordingly, it is an object of the present invention to provide a packing, either internal or external or both, consisting substantially or mostly of resilient sealing material and having back-up structure which is initially formed as an integral piece for easy handling and assembly with the packing and which is subject to fracturing into individual segments upon the application of axial pressure to the packing.

A more detailed object is to provide a packing having a back-up structure of the type described, which is frangible upon the application of axial forces to the packer body.

I attain these objects by providing an integral back-up disk or cup structure, which may be molded into or otherwise applied to resilient or pliable packing material and which has weakened regions which cause the back-up structure to fracture into individually displaceable segments when the packing is subjected to end-wise pressure.

In the accompanying drawings which illustrate the invention, FIG. 1 is a partial longitudinal section through an oil well casing with the novel packer inserted therein.

FIG. 2 is a half longitudinal section and half elevation of the structure in FIG. 1 in expanded, set condition.

FIG. 3 is a vertical center section through the packer, half showing the back-up structure only.

FIG. 4 is a top plan view of the back-up structure in FIG. 3.

FIG. 5 is a vertical transverse section showing a modified form of packing.

FIG. 6 is a plan view of the insert portion of another modified form of packer.

FIG. 7 is a section on line 7—7 of FIG. 6 half showing the back-up structure only and half the rubber body also.

FIG. 8 is a section through an expanded piston embodying the packing of FIG. 7.

FIG. 9 is a horizontal section on line 9—9 of FIG. 8.

FIGS. 1 and 2 show a section of oil well casing 12 having inserted therein a packer mounted on a mandrel 13. At the upper part of the mandrel there is shown a body 14 mounting hydraulically operated hold-down devices 15 and at the bottom are provided annularly arranged hold-up slips 16 actuable radially by a wedge 17. Three annular packing ring members, generally designated 18, provided with spacer washers 19 are slidably received about the mandrel between body 14, below devices 15, and wedge member 17.

The packing ring members 18 are alike and one is illustrated considerably enlarged in FIG. 3. Each member includes a cylindrical body 22 of synthetic rubber or other suitable resilient or yielding material having an outer side wall 23 and an inner side wall 24 which abuts the mandrel. Received upon the tapered upper surface 25 is a generally frusto-conical back-up or support ring structure, generally designated 26 and made of a plastic or other material of adequate axial rigidity for its support function, yet frangible along weakened lines, as will be explained. This support structure, as also shown in FIG. 4, has radial corner slots 27 arranged regularly about the upper surface thereof and terminating just short of the inner wall 28 which registers in the assembly with wall 24 of body 22. In slightly staggered relationship with slots 27 are additional slots 29 formed in the undersurface of the structure. Each adjacent pair of radial slots 27 and 29 form a weakened region. In the assembly, as shown at the left side of FIG. 3, the under surface slots 29 are filled with rubber of the packer body 22. The arrangement is such that when axial compressive pressures are applied to the ends of the packer body, the rubber is compressed longitudinally and swelled radially. The pressure of the expanding rubber causes the support structure to radially fracture at these weakened regions to form individual segments which may expand radially with the packer body so as to maintain a firm back-up support and brace for the outer edge of the packer rubber. The abutting inclined wedging surfaces on the back-up ring and rubber body enhance this effect. Thus, the packer rubber is prevented from being squeezed into the space 30 between the casing and packer body.

In operation of the form just described, upward pressure applied to mandrel 13 relative to upper body part 14 expands slips 16 into engagement with the casing wall and also applies compressive forces to the packer rings 18 causing these rings to expand, as shown in FIG. 2, into sealing engagement with the casing wall. Thereafter, hydraulic pressure applied through the mandrel will actuate hold down elements 15 outwardly into engagement with the casing wall, while fluid pressures below the packer will be prevented from passing upwardly. Such fluid pressure as applied to the under surface of the packer will enhance the radial expansion of the packer and improve the seal, but cannot, because of the novel back-up or support structure, cause the packer rubber to deform endwise into the annulus 30. It has been found that as long as the packer rubber retains its resiliency, it can be released and reset without adverse interference from the segmented support structure. The back-up ring structure may be fractured by the application of axial compressive forces incident to molding of the body rubber, or after molding, or when subjected to pressure in the field.

FIG. 5 shows a form of packer in which the supporting body portion 33 of the packer is formed of generally disk shape reinforcing material and has relatively thin coatings 34 and 35 of sealing material applied, respectively, to its inner and outer surfaces. Portion 33 is made of a suitable non-yielding but frangible material, for instance, as described above. Formed on the under surface of body 33 and intermediate the inner and outer surfaces thereof is a V-sectioned, annular concavity 36 and, in alignment therewith, there is formed in the upper surface of the body a smaller V-section, annular concavity 37. These concavities form a circular weakened zone and body 33 will also be provided with radial weakened zones, which may be as shown in FIGS. 3 and 4, or non-staggered radial slots, along the lines of those in FIGS. 7, 8 and 9.

Received in lower concavity 36 is a wedging ring 38 having a V-sectioned rib portion 39 which fits within concavity 36. Ring 38 is made of any relatively hard material of suitable rigidity to perform its wedging function. This type of packer ring may be substituted for the rings 18 in FIGS. 1 and 2. When axial pressure is applied to the under surface of wedge ring 38, radial forces are applied to the weakened regions formed by concavities 36 and 37 in the support body, as well as the radial weakened regions, to break the support body into individual circumferential, as well as inner and outer segments, as will be described more clearly in connection with FIGS. 7, 8 and 9. These radial forces cause sealing engagement between rubber coatings or liner elements 34 and 35 and their companion walls.

FIGS. 6, 7, 8 and 9 show a piston having a resilient body 40 of rubber or other suitable resilient material and provided with a central aperture 41 which receives the end of a piston rod 42. Received upon the upper surface of packing material 40 is a disk-like support structure of frangible material as described above, generally designated 43. On the under surface of the support structure there are provided radial cuts, the outer portions of which extend only partially through the support structure, as indicated at 44a in FIGS. 6 and 7, while the inner portions thereof are cut entirely through the support structure, as indicated at 44b. In the assembly, as shown at the left side of FIG. 7, the rubber body material fills these slots. The support disk is also provided on its under surface with an annular V-section depression 45 into which a similarly shaped, complementary circumferential rib on the body projects to form wedging surfaces.

In the assembly, as shown in FIG. 8, the packing body is secured against a collar 46 on the piston rod by means of a nut 78 and washer 48 which bears against the upper surface of the support disk. When fluid pressure is applied to the under surface of the piston, body material 40 is radially expanded and caused to assume a position as in FIG. 8, with its outer surface 50 tightly in engagement with the companion wall of cylinder 49. At the same time, rubber material 40 is forced against the walls of annular depression 45 and radial slots 44a, 44b so as to fracture the support disk at the annular and radial weakened regions, forming individual inner and outer segments, as at 43a and 43b in FIGS. 8 and 9. As will be seen from FIG. 9, segments 43b will be displaced outwardly and somewhat separated in a circumferential direction, while conforming with the outward displacement of the outer face 50 of the packing material. On the other hand, inner segments 43a will be displaced slightly inwardly, in a radial direction, and drawn together circumferentially to conform with the inner surface 41 of the packer body material. The inner portions 44b of the radial slots, being cut entirely through the support disk, permit such contraction of inner segment 43a. In this form, both the inner and outer sealing surfaces of the yielding body material will be continually supported by means of the fragmented back-up structure which remains substantially flush with the expanding side walls of the body. If desired, inclined transverse fractured surfaces, as in FIG. 4, or other overlapping expedients may be used to resist or prevent extrusion of body rubber between the back-up segments.

The assembly of the integral back-up disk or cup with the yielding packing material, as by molding, is greatly facilitated so that the described packings, including the supports, may be constructed very much more cheaply than previous supported packers, yet will fully support and brace the sealing edges of the packers against abnormal end-wise deformation. The frangible supports may be provided for various types of conventional resilient packings and of course will conform to the particular shape requirements and may be applied to one or both end faces of the packing. The exclusive use of all modifications as come within the scope of the appended claims is contemplated.

I claim:

1. A packing comprising an annular body substantially of resilient sealing material having a side wall for sealingly engaging a cylindrical companion surface and an end wall for receiving axial forces applied to said body, and a plastic back-up ring embedded in said end wall and with its edge located substantially flush with said side wall for resisting edgewise deformation of said body material upon application of axial forces thereto, said ring, initially, being unitary and having frangible weakened regions extending thereacross and effective to enable said ring to be fractured upon application of axial forces to said body to cause radial expansion thereof.

2. A packing as described in claim 1 in which said body and said ring engage along complementary inclined wedging surfaces for applying radial forces to said ring, upon the application of axial forces to said body, for initially fracturing said ring and, thereafter, causing the ring segments to remain flush with said body side wall.

3. A packing comprising an annular body substantially of resilient sealing material subject to lateral swelling on the application of axial forces thereto and having a side wall for sealing engagement with a companion surface, said body also having an end wall with an axially projecting inclined portion, and a plastic back-up ring lodged against said end wall and initially being unitary and having frangible weakened regions extending thereacross, said ring also having an inclined surface portion complementary to and abutting said inclined portion of said body to enable said ring to be fractured at said regions by the application of opposed transverse forces to expand the body and for causing the fractured segments of said ring to remain substantially flush with said side wall during such expansion of said body.

4. A packing as described in claim 3 in which said body has opposite side walls and said back-up ring has edges located flush with both of said side walls and has grooving including opposed inclined surfaces and said body has a generally V-section, axially projecting rib lodged in said grooving to enable the application of opposing radial forces to said ring for initially fracturing the same along said grooving and thereafter causing the fractured ring segments to remain substantially flush with said body side walls during such expansion of said body.

References Cited by the Examiner

UNITED STATES PATENTS

| 2,050,620 | 8/36 | Mason | 277—195 |
|---|---|---|---|
| 2,305,276 | 12/42 | Rushmore | 277—195 |
| 2,448,147 | 8/48 | Jacobsen | 29—413 |
| 2,626,193 | 1/53 | Patterson | 277—223 |
| 2,633,808 | 4/53 | Webber | 277—188 XR |
| 2,765,023 | 10/56 | Fagg et al. | 277—237 XR |
| 2,858,602 | 11/58 | Johnson | 29—413 |

FOREIGN PATENTS 664,940  1/52  Great Britain.

EDWARD V. BENHAM, Primary Examiner.

SAMUEL B. ROTHBERG, Examiner.